(12) United States Patent
Fuchigami et al.

(10) Patent No.: US 12,280,905 B2
(45) Date of Patent: Apr. 22, 2025

(54) HEAT SEALING DEVICE

(71) Applicant: FUJIFILM Corporation, Tokyo (JP)

(72) Inventors: Yujiro Fuchigami, Kanagawa (JP); Fumio Noji, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/354,875

(22) Filed: Jul. 19, 2023

(65) Prior Publication Data

US 2023/0365286 A1 Nov. 16, 2023

Related U.S. Application Data

(63) Continuation of application No. PCT/JP2022/000376, filed on Jan. 7, 2022.

(30) Foreign Application Priority Data

Feb. 22, 2021 (JP) .................. 2021-026600

(51) Int. Cl.
*B65B 1/00* (2006.01)
*B65B 51/14* (2006.01)
*B65B 51/32* (2006.01)
*B65B 51/10* (2006.01)

(52) U.S. Cl.
CPC .............. *B65B 51/32* (2013.01); *B65B 51/14* (2013.01); *B65B 2051/105* (2013.01)

(58) Field of Classification Search
CPC ....... B65B 51/303; B65B 51/32; B65B 9/213; B65B 51/10; B65B 9/04
USPC ........ 53/375.3, 551, 552, 374.8, 375.9, 433, 53/441, 451, 477, 478, 479
See application file for complete search history.

(56) References Cited

U.S. PATENT DOCUMENTS 5,379,572 A 1/1995 Giovannone
5,678,390 A * 10/1997 Pruett .................. B65B 51/306
53/550

(Continued)

FOREIGN PATENT DOCUMENTS

DE  1 160 356 B  12/1963
DE  1 228 907 B  11/1966

(Continued)

OTHER PUBLICATIONS

International Preliminary Report on Patentability and Written Opinion of the International Searching Authority for International Application No. PCT/JP2022/000376, dated Aug. 31, 2023, with an English translation.

(Continued)

*Primary Examiner* — Jacob A Smith
(74) *Attorney, Agent, or Firm* — Birch, Stewart, Kolasch & Birch, LLP

(57) ABSTRACT

There is provided a heat sealing device that seals a film for packaging an article by heat welding, with the film sandwiching the article in between and being disposed in a partially overlapped state around the article, the heat sealing device including: a sealing head that heat-welds a seal portion to be sealed in the film; a first cooling head that cools the seal portion after heat welding by the sealing head; and a second cooling head that cools at least a part of an article side region in the film, which is located on an article side with respect to the seal portion.

14 Claims, 13 Drawing Sheets

(56) References Cited

U.S. PATENT DOCUMENTS

| | | | | |
|---|---|---|---|---|
| 7,076,930 | B2* | 7/2006 | Rimondi | B65B 9/073 53/433 |
| 2003/0213555 | A1* | 11/2003 | Bernardi | B65B 7/2878 156/308.2 |
| 2010/0107568 | A1* | 5/2010 | Inaba | B29C 66/83423 53/370.7 |

FOREIGN PATENT DOCUMENTS

| | | | |
|---|---|---|---|
| DE | 10 2004 051 923 A1 | 5/2006 | |
| DE | 10 2018 219 300 A1 | 5/2020 | |
| JP | 54-68377 A | 6/1979 | |
| JP | 54-157969 U | 11/1979 | |
| JP | 58-21503 U | 2/1983 | |
| JP | 6-72417 A | 3/1994 | |
| JP | 7-156918 A | 6/1995 | |
| JP | 2001-130506 A | 5/2001 | |
| JP | 2004-237675 A | 8/2004 | |
| JP | 2005-289461 A | 10/2005 | |
| JP | 2009-242000 A | 10/2009 | |
| JP | 2011105356 A * | 6/2011 | B65B 51/10 |

OTHER PUBLICATIONS

International Search Report for International Application No. PCT/JP2022/000376, dated Mar. 15, 2022, with an English translation.
Extended European Search Report for European Application No. 22755755.0, dated Jul. 4, 2024.

* cited by examiner

HEAT SEALING DEVICE

CROSS-REFERENCE TO RELATED APPLICATIONS

This application is a continuation of International Application No. PCT/JP2022/000376, filed on Jan. 7, 2022, which claims priority from Japanese Patent Application No. 2021-026600, filed on Feb. 22, 2021. The entire disclosure of each of the above applications is incorporated herein by reference.

BACKGROUND

1. Technical Field

The present disclosure relates to a heat sealing device.

2. Related Art

As a film for packaging an article, for example, a heat weldable film such as a plastic film is known, and a heat sealing device that seals this film by heat welding is known. The heat sealing device seals a film by heat welding with the film sandwiching the article in between and being disposed in a partially overlapped state around the article. The heat sealing device comprises a sealing head that heat-welds a seal portion of the film.

After the film is sealed by the sealing head, tension is applied, for example, in order to transport a packaged article, but in a state in which the seal portion is heated when the tension is applied to the film, there is a risk that the film may stretch. Since it takes time for the seal portion to naturally cool down, in order to increase a throughput of a heat sealing process, some heat sealing devices are provided with a cooling head that cools the seal portion after heat welding by the sealing head (see JP2009-242000A and JP2004-237675A).

Meanwhile, JP1983-21503U (JP-S58-21503U) discloses a heat sealing device for continuously packaging a plurality of articles. Specifically, the heat sealing device described in JP1983-21503U (JP-S58-21503U) uses a long film extending in an arrangement direction of the plurality of articles, seals the film covering the plurality of articles in a strip shape between the articles through a sealing bar (corresponding to the sealing head), and cuts off the center of the seal portion with a cutter after sealing.

The heat sealing device described in JP1983-21503U (JP-S58-21503U) is provided with a cooling bar (corresponding to the cooling head) that cools the vicinity of the seal portion to be sealed by the sealing bar during heat welding of the film. The cooling bar described in JP1983-21503U (JP-S58-21503U) cools the vicinity of the seal portion to suppress the occurrence of pinholes in the seal portion that has been softened by heating of the sealing bar.

SUMMARY

In the heat sealing devices of JP2009-242000A and JP2004-237675A, a seal part can be cooled by the cooling head, but there is a problem that it is difficult to suppress the thermal damage to the article caused by the heat of the sealing head during the heat welding of the seal portion. This is a particular problem in a case where a film for packaging a heat-sensitive article such as an article which is easily deteriorated or deformed by heat is sealed.

Even in the heat sealing device of JP1983-21503U (JP-S58-21503U), the cooling bar (cooling head) is for cooling the vicinity of a seal part, no consideration is given to thermal damage to the article.

The present disclosure has been made in view of the above circumstances, and an object of the present disclosure is to provide a heat sealing device capable of suppressing thermal damage to an article packaged by a film while improving a throughput of heat sealing.

According to the present disclosure, there is provided a heat sealing device that seals a film for packaging an article by heat welding, with the film sandwiching the article in between and being disposed in a partially overlapped state around the article, the heat sealing device comprising:
  a sealing head that heat-welds a seal portion to be sealed in the film;
  a first cooling head that cools the seal portion after heat welding by the sealing head; and
  a second cooling head that cools at least a part of an article side region in the film, which is located on an article side with respect to the seal portion.

In the heat sealing device of the present disclosure, it is preferable that a moving mechanism that moves the film and each of the sealing head, the first cooling head, and the second cooling head relative to each other and a control unit that controls each part of the sealing head, the first cooling head, the second cooling head, and the moving mechanism are further provided.

In the heat sealing device of the present disclosure, it is preferable that the control unit brings the second cooling head into contact with the article side region through the moving mechanism to start cooling of the article side region and then brings the sealing head into contact with the seal portion through the moving mechanism to start heat welding of the seal portion.

In the heat sealing device of the present disclosure, it is preferable that the control unit retracts the sealing head from the seal portion through the moving mechanism and brings the first cooling head into contact with the seal portion through the moving mechanism after heat welding by the sealing head.

In the heat sealing device of the present disclosure, it is preferable that the control unit continues to cool the article side region through the second cooling head from a start of heat welding of the seal portion by the sealing head to an end of cooling of the seal portion by the first cooling head.

In the heat sealing device of the present disclosure, it is preferable that the control unit controls a temperature of at least one of the first cooling head or the second cooling head to a preset temperature.

In the heat sealing device of the present disclosure, it is preferable that the preset temperature is 20° C. or lower.

In the heat sealing device of the present disclosure, it is preferable that the control unit controls a pressing pressure against a contact region in a case where the second cooling head is brought into contact with the article side region.

In the heat sealing device of the present disclosure, it is preferable that, in a case of cooling the article side region, an end part position on a sealing head side of a pressing surface of the second cooling head, which is pressed against the article side region of the film, is located on the sealing head side with respect to an end part position on the sealing head side of the article.

In the heat sealing device of the present disclosure, it is preferable that, in a case of cooling the article side region, a pressing surface of the second cooling head, which is pressed against the article side region of the film, is disposed at a position facing at least an outer peripheral edge of the article.

In the heat sealing device of the present disclosure, it is preferable that, in a case of cooling the article side region, the pressing surface of the second cooling head, which is pressed against the article side region of the film, is disposed at a position facing an entire surface of the article.

In the heat sealing device of the present disclosure, a sealing head side of the pressing surface may protrude more than the article side with the position facing the outer peripheral edge of the article as a reference.

In the heat sealing device of the present disclosure, it is preferable that, in a case where a width of the sealing head is denoted by LH, and a distance interval between the sealing head and the second cooling head is denoted by D, a relationship between D and LH satisfies

LH/1000<D<10LH.

In the heat sealing device of the present disclosure, it is preferable that, in a case where a width of the sealing head is denoted by LH, and a width of the first cooling head is denoted by LC, a relationship between LH and LC satisfies

LH/2<LC.

In the heat sealing device of the present disclosure, it is preferable that the seal portion is provided in a form of surrounding an entire periphery of the article, and the sealing head also has a frame shape corresponding to a shape of the seal portion.

With the heat sealing device of the present disclosure, it is possible to suppress thermal damage to the article packaged by the film while improving a throughput of heat sealing.

DESCRIPTION OF EMBODIMENTS

Hereinafter, embodiments of the technology of the present disclosure will be described with reference to the drawings.

[Heat Sealing Device]

Figure 1:
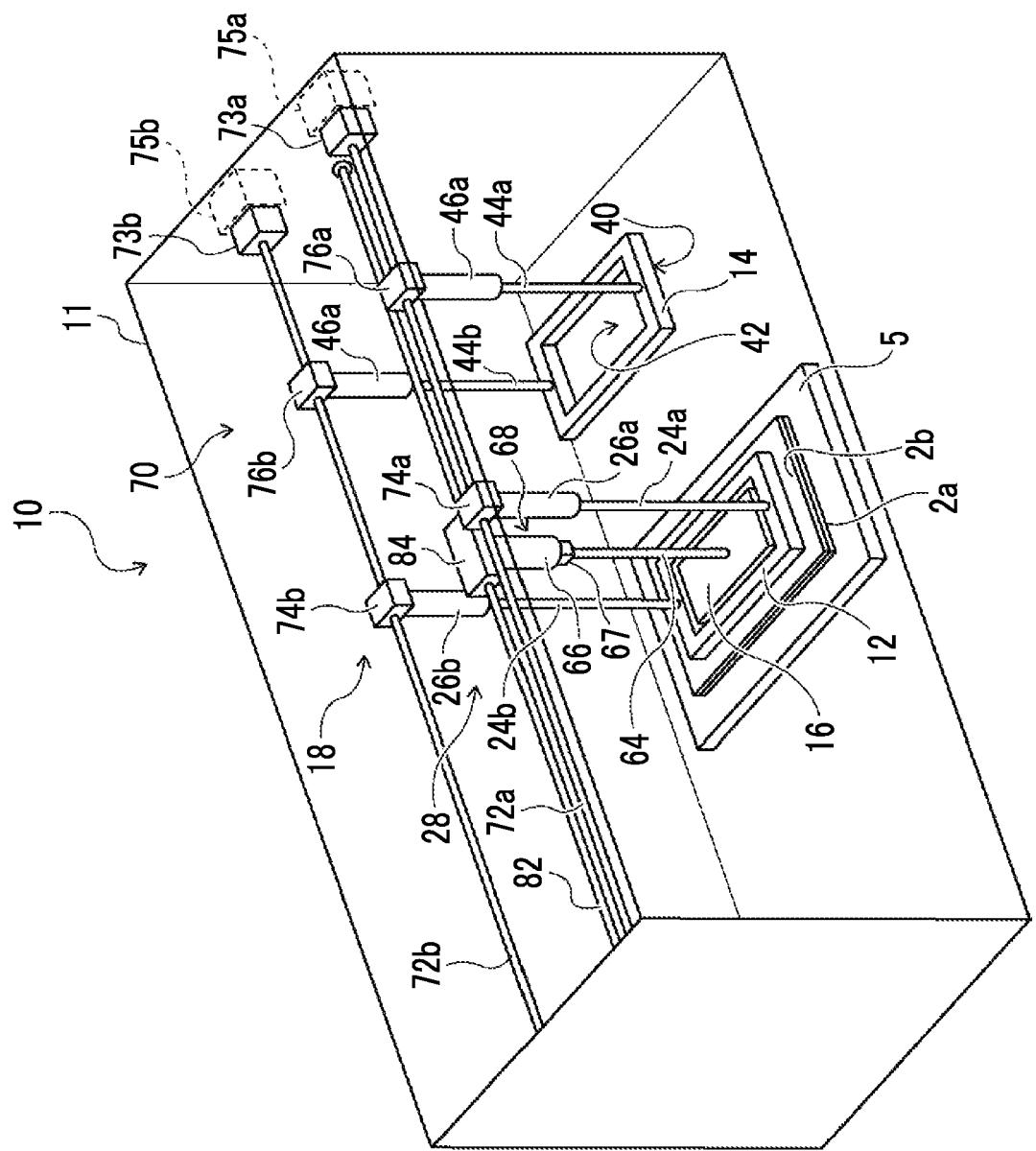
FIG. 1 is a perspective view showing a schematic configuration of a heat sealing device.

FIG. 1 is a perspective view showing a schematic configuration of a heat sealing device 10 of an embodiment of the present disclosure. The heat sealing device 10 is a device that seals, by heat welding, films 2a and 2b which are for packaging an article 1 (see FIGS. 2 and 3) and which sandwich the article 1 and are disposed in a partially overlapped state around the article 1. The heat sealing device 10 of the present embodiment comprises a sealing head 12, a first cooling head 14, and a second cooling head 16 in a housing 11. In the present embodiment, for convenience of illustration, a horizontal plane is defined as an XY plane, a longitudinal direction of the housing 11 is defined as an X direction, a transverse direction is defined as a Y direction, and a direction perpendicular to the XY plane is defined as a Z direction. That is, the Z direction is a direction along a vertical direction (up-down direction).

Further, the housing 11 is provided with a pallet 5. The article 1 is placed on the pallet 5 in a state of being sandwiched between the film 2a and the film 2b. In the present example, the article 1 is placed on the film 2a in a state in which the film 2a is spread out on the pallet 5, and the film 2b is overlapped on the top of the article 1.

Figure 2:
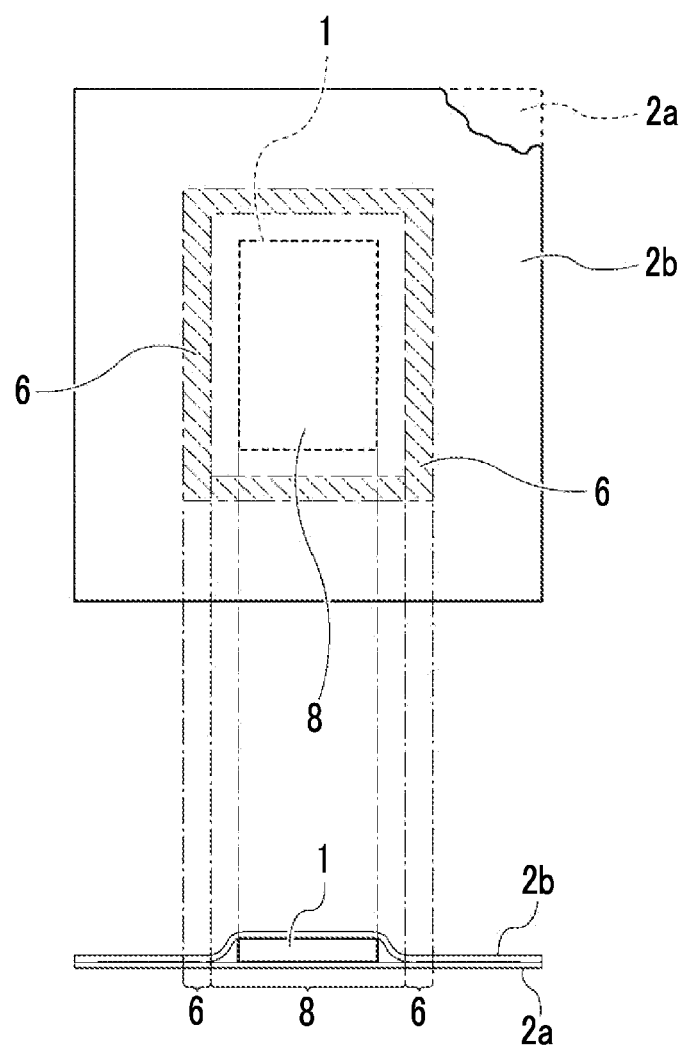
FIG. 2 is a diagram illustrating a seal portion.

FIG. 2 is a plan view and a cross-sectional view showing a state in which the film 2a, the article 1, and the film 2b are overlapped with each other. In the plan view of FIG. 2, the film 2a is shown by cutting out a part of the film 2b. The plane size of each of the film 2a and the film 2b is larger than the plane size of the article 1. The article 1 is disposed substantially in the center of the film 2a and the film 2b, and in a peripheral portion of the film 2a and the film 2b around the article 1, the film 2a and the film 2b overlap each other in a state of being in direct contact with each other. A part of a portion where the film 2a and the film 2b are in direct contact is a seal portion 6 where the film 2a and the film 2b are sealed. In the present example, the seal portion 6 to be sealed in the film 2a and the film 2b is a strip-shaped region indicated by an alternate long and short dash line in the drawing and provided in a form of surrounding the entire periphery of the article 1. In the present specification, a region located on an article 1 side with respect to the seal portion 6 is referred to as an article side region 8. Hereinafter, in a case where it is necessary to distinguish between the film 2a and the film 2b, the designation symbol "a" or "b" is added for distinction, and in a case where the distinction is not necessary, the film 2a and the film 2b are referred to as a film 2 without the designation symbol.

Figure 4:
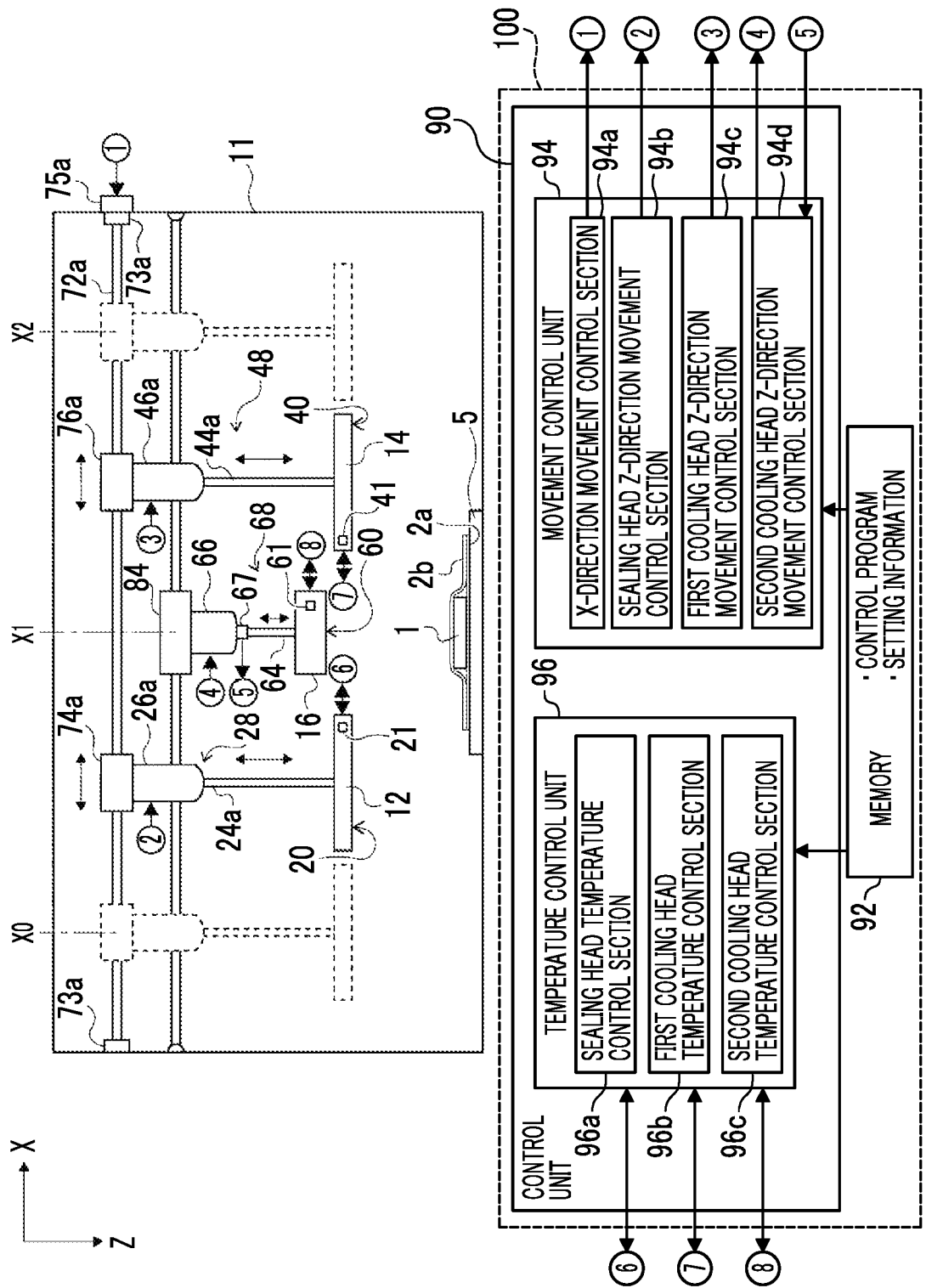
FIG. 4 is a schematic front view of the heat sealing device.

The heat sealing device 10 further comprises a moving mechanism 18 that moves the film 2 and each of the sealing head 12, the first cooling head 14, and the second cooling head 16 relative to each other, and a control unit 90 that controls each part of the sealing head 12, the first cooling head 14, the second cooling head 16, and the moving mechanism 18 (see FIG. 4).

Figure 3:
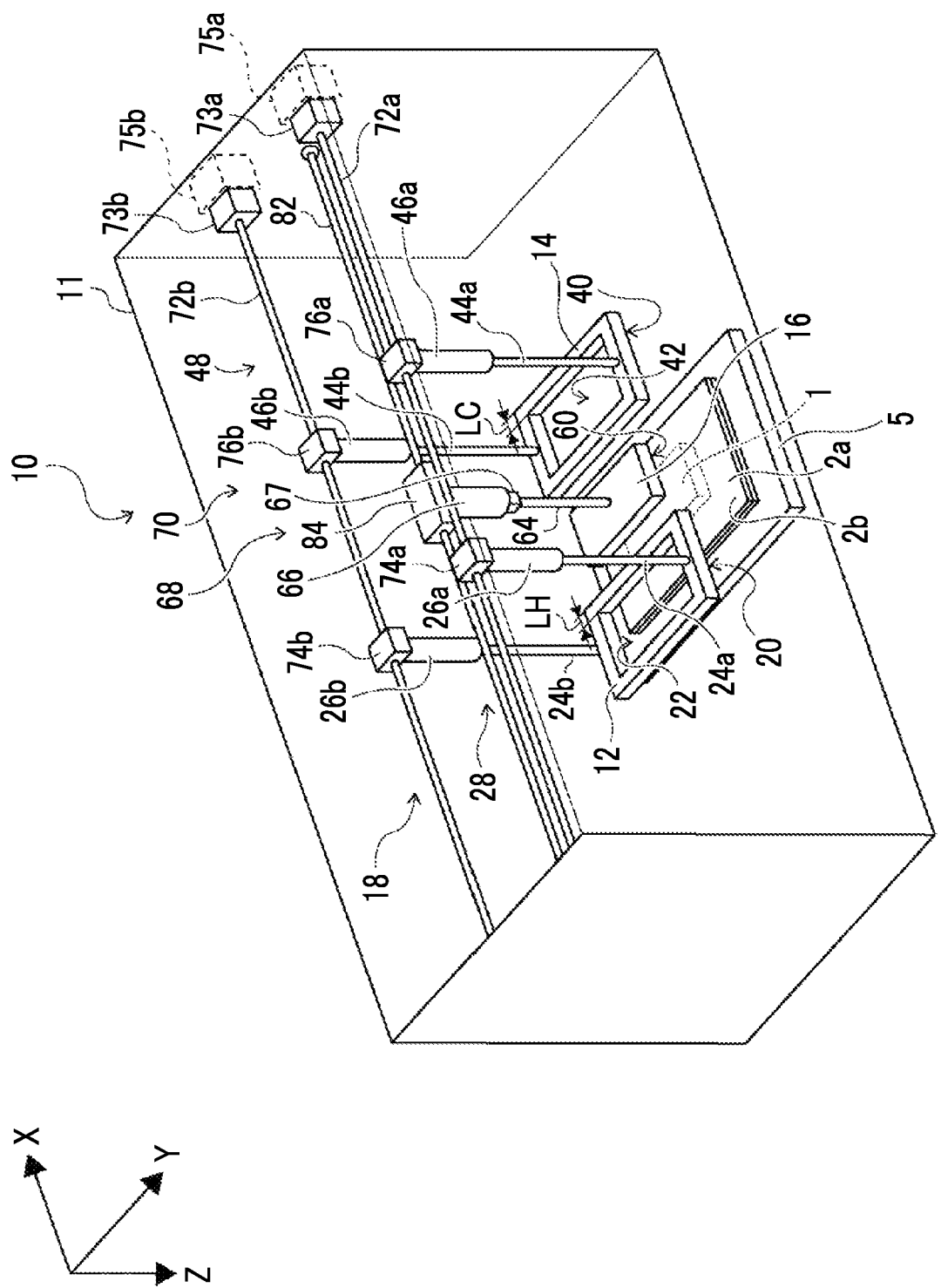
FIG. 3 is a perspective view showing a state in which a sealing head and a first cooling head are moved in the heat sealing device.
Figure 5:
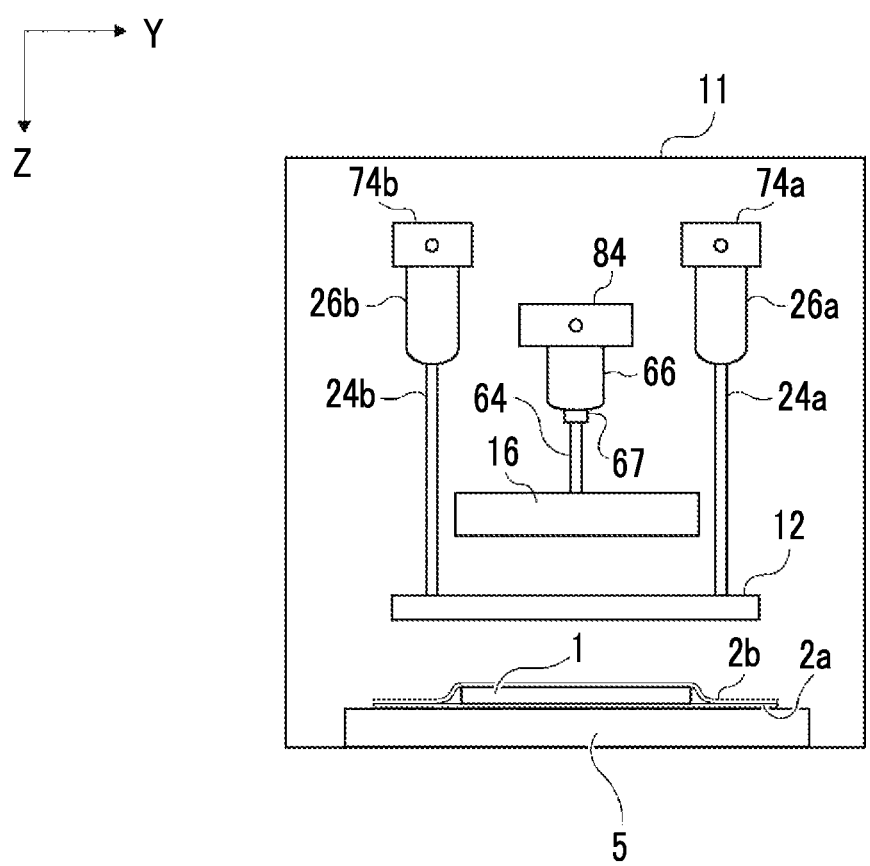
FIG. 5 is a schematic side view of the heat sealing device.

FIG. 3 is a diagram showing a state in which the sealing head 12, the first cooling head 14, and the second cooling head 16 are moved from the position of FIG. 1 in the heat sealing device 10. Specifically, in FIG. 3, the sealing head 12 and the first cooling head 14 are being moved in the X direction from the position of FIG. 1, and the second cooling head 16 is being moved upward in the Z direction from the position of FIG. 1. FIG. 4 shows a schematic front view of the heat sealing device 10 and a schematic diagram of the functional configuration of the control unit 90. FIG. 5 is a schematic side view of the heat sealing device 10.

The sealing head 12 heat-welds the seal portion 6 of the film 2. In the present example, the sealing head 12 has a frame shape having a rectangular outer shape and includes a sealing surface 20 that is formed on a surface facing the film 2 and that comes into contact with the film 2. The sealing surface 20 has a shape similar to the shape of the seal portion 6 surrounding the outer periphery of the article 1 and faces the seal portion 6. A heater (not shown) and a temperature sensor 21 (see FIG. 4) are built in the sealing head 12. By operating the heater, the sealing surface 20 of the sealing head 12 is heated. The temperature sensor 21 detects the temperature of the sealing surface 20. The sealing head 12 is preferably made of a material having high thermal conductivity efficiency, for example, a metal, such as stainless steel, or ceramics. As shown in FIG. 2, in the present example, the seal portion 6 is provided in a form of surrounding the entire periphery of the article 1, and the shape of the sealing head 12 is a frame shape corresponding to the shape of the seal portion 6. In the present example, since the article 1 has a rectangular shape, the sealing head 12 has a frame shape having a rectangular opening 22 corresponding to the shape of the article 1. This makes it possible to seal the seal portion 6 surrounding the entire periphery of the article 1 at one time. The frame shape is a rectangular frame in the present example, but may be an annular frame, a polygonal frame other than a rectangular shape, or the like, depending on the article. In the sealing head 12, the sealing surface 20 heated by the heater is pressed onto the seal portion 6, and the seal portion 6 is heat-welded. In the present example, the shape of the sealing surface 20 of the sealing head 12 has a similar shape to the outer shape of the article 1, but in a case where the shape of the sealing surface 20 is larger than the outer shape of the article 1, the shape of the sealing head 12 may not be similar to the outer shape of the article 1. In addition, the seal portion 6 does not necessarily have to be the entire outer periphery and may be a part of the outer periphery. The shape of the seal portion 6 is appropriately determined according to the design.

The first cooling head 14 cools the seal portion 6 after the heat welding by the sealing head 12. In the present example, the first cooling head 14 has a frame shape having a rectangular outer shape as in the sealing head 12 and includes a pressing surface 40 that is formed on a surface facing the film 2 and that comes into contact with the film 2. The pressing surface 40 has substantially the same frame shape as the sealing surface 20 of the sealing head 12 and faces the seal portion 6. In the first cooling head 14, a cooling element (not shown) and a temperature sensor 41 (see FIG. 4) are built in the first cooling head 14. By operating the cooling element, the pressing surface 40 is cooled. The first cooling head 14 is preferably made of a material having high thermal conductivity efficiency, for example, a metal, such as aluminum. In the present example, the shape of the first cooling head 14 is the same as that of the sealing head 12 and is a frame shape having a rectangular opening 42. In the first cooling head 14, after the heat welding by the sealing head 12, the pressing surface 40 cooled by the cooling element is pressed onto the seal portion 6 to cool the seal portion 6.

The shape of the pressing surface 40 of the first cooling head 14 does not necessarily have to be the same as the sealing surface 20 as long as the seal portion 6 can be cooled. The shape of the pressing surface 40 is appropriately determined according to the shape of the seal portion 6, the shape of the sealing head 12, or the like.

Figure 6:
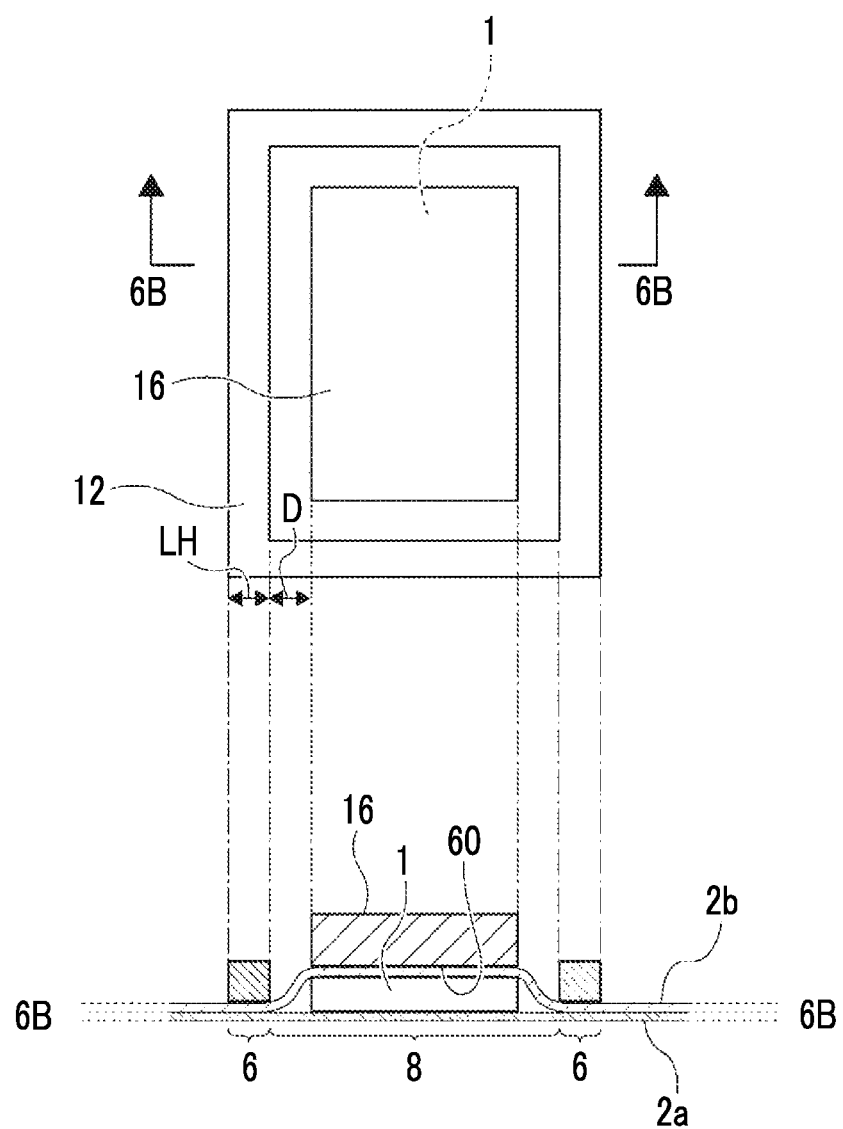
FIG. 6 is a diagram showing a positional relationship between the sealing head, a second cooling head, and an article.

Further, in a case where the width of the sealing head 12 is denoted by LH (see FIGS. 3 and 6) and the width of the first cooling head 14 is denoted by LC (see FIG. 3), the relationship between LH and LC preferably satisfies LH/2<LC. Here, LH corresponds to the width of the seal portion 6. More specifically, in the present example, the seal portion 6 has a rectangular frame shape, and the width of the seal portion 6 indicates a width in a direction orthogonal to a direction in which one side of the rectangular frame extends. Further, in the present example, the sealing head 12 and the first cooling head 14 each have a rectangular frame shape corresponding to the shape of the seal portion 6, and LH and LC each indicate a width in a direction orthogonal to a direction in which one side of the rectangular frame shape extends, as shown in FIGS. 3 and 6. In a case where LC is larger than half of LH, it is effective for cooling because more than half of the seal portion 6 can be cooled. However, it is preferable that the entire seal portion 6 can be pressed. In a case where the sealing head 12 and the first cooling head 14 each have an annular frame shape, LH and LC are each a radial width of the ring in the annular line.

The second cooling head 16 cools at least a part of the article side region 8 in the film 2, which is located on the article 1 side with respect to the seal portion 6. The second cooling head 16 in the present example has a pressing surface 60 that is equivalent in size and shape to the article 1. A cooling element (not shown) and a temperature sensor 61 (see FIG. 4) are built in the second cooling head 16. By operating the cooling element, the pressing surface 60 is cooled. In the present example, the shape of the second cooling head 16 is a flat plate shape, and the plane shape is a rectangular shape. The plane size of the second cooling head 16 is smaller than the plane size of the opening 22 of the sealing head 12. In the present embodiment, the second cooling head 16 presses the pressing surface 60 against the article side region 8 of the film 2b. The film 2b is in contact with a peripheral surface (an upper surface in the present example) of the article 1. Therefore, by pressing the pressing surface 60 of the second cooling head 16 against the article side region 8 of the film 2, the peripheral surface of the article 1 is pressed by the pressing surface 60 via the film 2b. As a result, the article 1 is cooled. That is, the first cooling head 14 has a function of cooling the seal portion 6, whereas the second cooling head 16 has a function of cooling the article 1 via the film 2b.

The cooling elements provided in the first cooling head 14 and in the second cooling head 16 are each, for example, a Peltier element, but the cooling element may be provided with other cooling mechanisms such as air cooling or water cooling.

FIG. 6 is a diagram showing a positional relationship between the sealing head 12 and the second cooling head 16 in the present embodiment, in which the upper figure is a plan view and the lower figure is a cross-sectional view taken along line 6B-6B. As shown in FIG. 6, the second cooling head 16 is pressed against the article 1 via the film 2b, and the sealing head 12 is pressed against the seal portion 6 surrounding the article 1. A distance interval D is provided between the sealing head 12 and the second cooling head 16, which prevents the sealing head 12 and the second cooling head 16 from interfering with each other during ascending and descending. Specifically, the distance interval D is a distance between an inner peripheral surface of the frame-shaped sealing head 12 and an outer peripheral surface of the second cooling head 16. In a case where the distance interval D is several μm or more, for example, 2 μm or more, the sealing head 12 and the second cooling head 16 can be raised and lowered without interfering with each other. The distance interval D preferably satisfies, in a case where the width of the sealing head 12, which is the width of the seal portion 6, is denoted by LH, LH/1000<D<10LH.

The width LH of the sealing head 12 need only be appropriately set depending on the article or the like and is, for example, 1 mm to 20 mm.

In the present embodiment, as shown in FIGS. 1, 3, and 4, the moving mechanism 18 includes a sealing head Z-direction moving portion 28, a first cooling head Z-direction moving portion 48, a second cooling head Z-direction moving portion 68, and an X-direction moving portion 70 that moves the sealing head 12 and the first cooling head 14 in the X direction. The sealing head Z-direction moving portion 28 moves the sealing head 12 in the Z direction. The first cooling head Z-direction moving portion 48 moves the first cooling head 14 in the Z direction. The second cooling head Z-direction moving portion 68 moves the second cooling head 16 in the Z direction.

The sealing head Z-direction moving portion 28 in the present example is composed of two cylinders 26a and 26b and two shafts 24a and 24b extending in the Z direction. A part of the shaft 24a on the upper end side is accommodated in the cylinder 26a, and an accommodation amount of the upper end side of the shaft 24a in the cylinder 26a changes, whereby a portion of the shaft 24a, which protrudes downward from the cylinder 26a, expands and contracts in the Z direction. An actuator for expanding and contracting the shaft 24a is built in the cylinder 26a. The actuator includes, for example, a hydraulic pump, a motor, a solenoid, and the like. As described above, an expansion and contraction mechanism is composed of a set of one cylinder 26a and one shaft 24a extending in the Z direction. A set of the cylinder 26b and the shaft 24b also constitutes the same expansion and contraction mechanism as the set of the cylinder 26a and the shaft 24a. The sealing head Z-direction moving portion 28 is composed of these two sets of expansion and contraction mechanisms.

The lower ends of the shafts 24a and 24b constituting the respective expansion and contraction mechanisms are attached to two opposing sides of the frame-shaped sealing head 12, respectively. The shafts 24a and 24b are expanded and contracted with respect to the cylinders 26a and 26b, respectively, so that the position of the sealing head 12 in the Z direction changes. In this way, the sealing head Z-direction moving portion 28 raises and lowers the sealing head 12 with respect to the film 2. In order to prevent the sealing surface 20 from tilting when the sealing head 12 is raised and lowered, the two sets of expansion and contraction mechanisms are driven in synchronization with each other in the sealing head Z-direction moving portion 28, so that the expansion and contraction amounts are controlled to match. FIG. 1 shows a state in which the shafts 24a and 24b are expanded with respect to the cylinders 26a and 26b, respectively, and the seal portion 6 is pressed by the sealing surface 20 of the sealing head 12. In addition, FIG. 3 shows a state in which the shafts 24a and 24b are contracted with respect to the cylinders 26a and 26b, respectively.

The first cooling head Z-direction moving portion 48 of the present example also has substantially the same configuration as the sealing head Z-direction moving portion 28. That is, the first cooling head Z-direction moving portion 48 is composed of two cylinders 46a and 46b and two shafts 44a and 44b extending in the Z direction. The two cylinders 46a and 46b and the two shafts 44a and 44b extending in the Z direction constitute two sets of expansion and contraction mechanisms. The cylinders 46a and 46b have the same actuators as the cylinders 26a and 26b. One end of the shaft 44a and one end of the shaft 44b are respectively attached to two opposing sides of the frame-shaped first cooling head 14 at the lower ends of the shafts 44a and 44b constituting the respective expansion and contraction mechanisms. The shafts 44a and 44b expand and contract with respect to the cylinders 46a and 46b, so that the position of the first cooling head 14 in the Z direction changes. In this way, the first cooling head Z-direction moving portion 48 raises and lowers the first cooling head 14 with respect to the film 2.

The second cooling head Z-direction moving portion 68 is composed of a cylinder 66 and a shaft 64 extending in the Z direction. An expansion and contraction mechanism is composed of the cylinder 66 and the shaft 64. This expansion and contraction mechanism is the same as the expansion and contraction mechanism described above in the sealing head Z-direction moving portion 28 and the first cooling head Z-direction moving portion 48. A lower end of the shaft 64 is attached to a central portion of the second cooling head 16. The shaft 64 expands and contracts with respect to the cylinder 66, so that the position of the second cooling head 16 in the Z direction changes. In this way, the second cooling head Z-direction moving portion 68 raises and lowers the second cooling head 16 with respect to the film 2. In the present embodiment, the second cooling head Z-direction moving portion 68 further comprises a load sensor 67 that detects a pressing pressure.

The X-direction moving portion 70 moves the sealing head 12 and the first cooling head 14 in the X direction, which is the longitudinal direction of the housing 11. The X-direction moving portion 70 in the present example integrally moves the sealing head 12 and the first cooling head 14 in the X direction, thereby selectively switching between two positions, that is, a position where the sealing head 12 and the seal portion 6 of the film 2 face each other and a position where the first cooling head 14 and the seal portion 6 of the film 2 face each other.

The X-direction moving portion 70 comprises, as an example, two ball screws 72a and 72b parallel to each other, first moving blocks 74a and 74b screwed onto the ball screws 72a and 72b, second moving blocks 76a and 76b, guide rails (not shown), and stepping motors 75a and 75b.

The cylinders 26a and 26b of the sealing head Z-direction moving portion 28 are fixed to the first moving blocks 74a and 74b, respectively. In addition, the cylinders 46a and 46b of the first cooling head Z-direction moving portion 48 are fixed to the second moving blocks 76a and 76b, respectively. The first moving blocks 74a and 74b and the second moving blocks 76a and 76b are attached to, for example, guide rails (not shown) provided on the ceiling of the housing 11 so as to be movable in the X direction. Both end parts of the ball screw 72a and both end parts of the ball screw 72b are respectively rotatably supported by a pair of shaft support portions 73a and a pair of shaft support portions 73b attached to opposing wall surfaces of the housing 11, which are perpendicular to the X direction. One end of the ball screw 72a and one end of the ball screw 72b are respectively connected to the drive shafts of the stepping motors 75a and 75b, which rotate in forward and reverse directions. Accordingly, in a case where the ball screws 72a and 72b are rotated by the stepping motors 75a and 75b, the first moving blocks 74a and 74b and the second moving blocks 76a and 76b move back and forth in the X direction. As a result, the sealing head 12 and the first cooling head 14 linearly move in the X direction.

As described above, the X-direction moving portion 70 integrally moves the sealing head 12 and the first cooling head 14 in the X direction, thereby making the sealing head 12 and the first cooling head 14 selectively face the film 2. The position where the sealing head 12 faces the seal portion 6 of the film 2 is a position shown in FIG. 1, and this position corresponds to a processing position X1 in FIG. 4. Since the sealing head 12 and the first cooling head 14 move integrally in the X direction, the distance interval therebetween in the X direction is constant. As shown in FIG. 1, in a case where the sealing head 12 is located at the processing position X1, the first cooling head 14 is located at a second retracted position X2 which is a position retracted from the processing position X1. Then, in a case where the first cooling head 14 moves from the second retracted position X2 to the processing position X1 facing the seal portion 6 of the film 2, the sealing head 12 moves to a first retracted position X0 opposite to the second retracted position X2 with the processing position X1 interposed therebetween. In this way, the sealing head 12 is movable between the processing position X1 where the films 2a and 2b that sandwich the article 1 are sealed and the first retracted position X0. In addition, the first cooling head 14 is movable between the second retracted position X2 and the processing position X1.

The X-direction moving portion 70 is not limited to the configuration in which the above ball screw is used, and other known linear moving mechanisms, such as rack and pinion, may be applied.

On the other hand, the cylinder 66 of the second cooling head Z-direction moving portion 68 is fixed to a fixing block 84 fixed to a support shaft 82 installed in parallel with the ball screws 72a and 72b. That is, unlike the first cooling head 14, the second cooling head 16 does not move in the horizontal direction including the X direction and can move only in the Z direction. As described above, in this heat sealing device 10, a moving mechanism of the second cooling head 16 in the horizontal direction is not provided, but the moving mechanism in the horizontal direction may be provided.

As shown in FIG. 4, in the present embodiment, the control unit 90 is incorporated in a control device 100, and the control device 100 comprises a memory 92. The control unit 90 controls each part of the heat sealing device 10 in an integrated manner. The control unit 90 is composed of a processor. An example of the processor is a central processing unit (CPU) that performs various types of control by executing a program. The CPU executes the program to function as the control unit 90 including a movement control unit 94 and a temperature control unit 96. The memory 92 is an example of a memory connected to or built in the CPU as the processor. For example, a control program is stored in the memory 92. The control unit 90 is realized by the CPU executing the control program. The control unit 90 includes the movement control unit 94 and the temperature control unit 96. These are realized by the CPU executing the control program.

In addition to the control program, the memory 92 stores setting information that is preset in order for the control unit 90 to perform various types of control. As the setting information, information necessary to perform a movement control of each of the sealing head 12 and the first cooling head 14 in the X direction and a movement control of each of the sealing head 12, the first cooling head 14, and the second cooling head 16 in the Z direction is recorded. In addition, in the present embodiment, the setting information also includes information necessary to control the temperature of each of the sealing head 12, the first cooling head 14, and the second cooling head 16.

The movement control unit 94 includes an X-direction movement control section 94a, a sealing head Z-direction movement control section 94b, a first cooling head Z-direction movement control section 94c, and a second cooling head Z-direction movement control section 94d. The movement control unit 94 drives and controls the X-direction moving portion 70, the Z-direction moving portion 28 of the sealing head 12, the Z-direction moving portion 48 of the first cooling head 14 and the Z-direction moving portion 68 of the second cooling head 16 through the movement control sections 94a to 94d, respectively.

The X-direction movement control section 94a drives the stepping motors 75a and 75b of the X-direction moving portion 70. In a sealing step, the X-direction movement control section 94a controls the movement of the sealing head 12 and the first cooling head 14 in the X direction to position the sealing head 12 at the processing position X1 and the first cooling head 14 at the second retracted position X2. In addition, for a cooling step of cooling the seal portion after the sealing step, the X-direction movement control section 94a controls the movement of the sealing head 12 and the first cooling head 14 in the X direction to retract the sealing head 12 from the processing position X1 to the first retracted position X0 and to position the first cooling head 14 from the second retracted position X2 to the processing position X1.

The sealing head Z-direction movement control section 94b drives the cylinders 26a and 26b to expand and contract the shafts 24a and 24b, thereby raising and lowering the sealing head 12. In the sealing step, in a state in which the sealing head 12 is positioned at the processing position X1, the cylinders 26a and 26b are driven to expand the shafts 24a and 24b, and the sealing surface 20 is pressed against the seal portion 6 of the laminated films 2a and 2b. The sealing head 12 is heated by the heater, and the sealing surface 20 is pressed against the seal portion 6 of the films 2a and 2b, thereby heat-welding the seal portion 6.

The first cooling head Z-direction movement control section 94c drives the cylinders 46a and 46b to expand and contract the shafts 44a and 44b, thereby raising and lowering the first cooling head 14. After the sealing step, in a state in which the first cooling head 14 is positioned at the processing position X1, the cylinders 46a and 46b are driven to expand the shafts 44a and 44b, and the pressing surface 40 is pressed against the welded seal portion 6. The first cooling head 14 is cooled by the cooling element, and the pressing surface 40 is pressed against the seal portion 6 to cool the seal portion 6.

The second cooling head Z-direction movement control section 94d drives the cylinder 66 to expand and contract the shaft 64, thereby raising and lowering the second cooling head 16. Before the sealing step, in a state in which the second cooling head 16 is positioned at the processing position X1, the cylinder 66 is driven to expand the shaft 64, and the pressing surface 60 is pressed against the article 1 via the film 2b. The second cooling head 16 is cooled by the cooling element, and the pressing surface 60 is pressed onto the article side region 8 to cool the article 1 via the film 2b.

In addition, the control unit 90 controls the temperatures of the sealing head 12, the first cooling head 14, and the second cooling head 16 to preset temperatures through the temperature control unit 96.

The temperature control unit 96 includes a sealing head temperature control section 96a, a first cooling head temperature control section 96b, and a second cooling head temperature control section 96c. The sealing head temperature control section 96a controls the temperature of the sealing head 12. The first cooling head temperature control section 96b controls the temperature of the first cooling head 14. The second cooling head temperature control section 96c controls the temperature of the second cooling head 16.

The sealing head temperature control section 96a compares the temperature of the sealing head 12 detected by the temperature sensor 21 provided in the sealing head 12 with the set temperature of the sealing head 12 held as the setting information in the memory 92, and adjusts the heater to control the temperature of the sealing head 12 to the set temperature. The set temperature of the sealing head 12 is, for example, about 100° C. to 200° C.

The first cooling head temperature control section 96b compares the temperature of the first cooling head 14 detected by the temperature sensor 41 provided in the first cooling head 14 with the set temperature of the first cooling head 14 held as the setting information in the memory 92, and adjusts the cooling element to control the temperature of the first cooling head 14 to the set temperature.

The second cooling head temperature control section 96c compares the temperature of the second cooling head 16 detected by the temperature sensor 61 provided in the second cooling head 16 with the set temperature of the second cooling head 16 held as the setting information in the memory 92, and adjusts the cooling element to control the temperature of the second cooling head 16 to the set temperature.

The set temperature of each of the first cooling head 14 and the second cooling head 16 is, for example, a predetermined constant temperature, and specifically, can be a predetermined temperature of 20° C. or lower.

Figure 7:
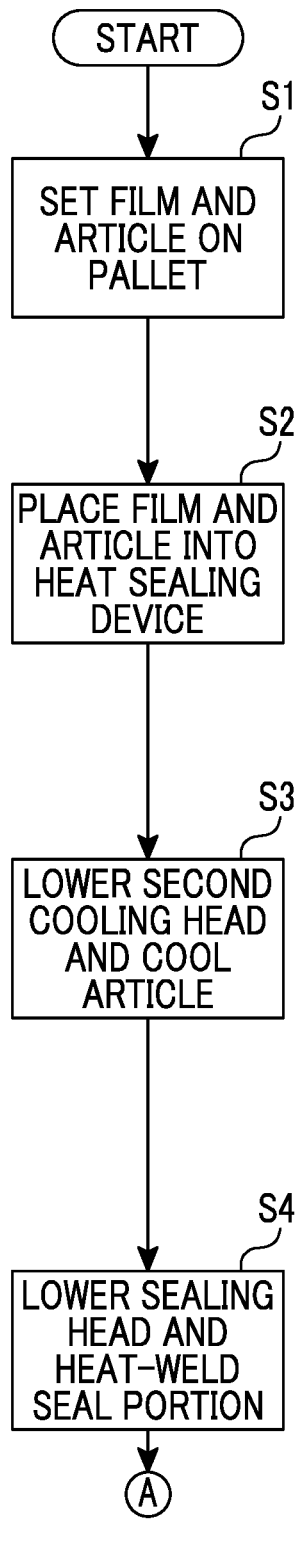
FIG. 7 is a diagram illustrating a processing step in the heat sealing device (No. 1).
Figure 7:
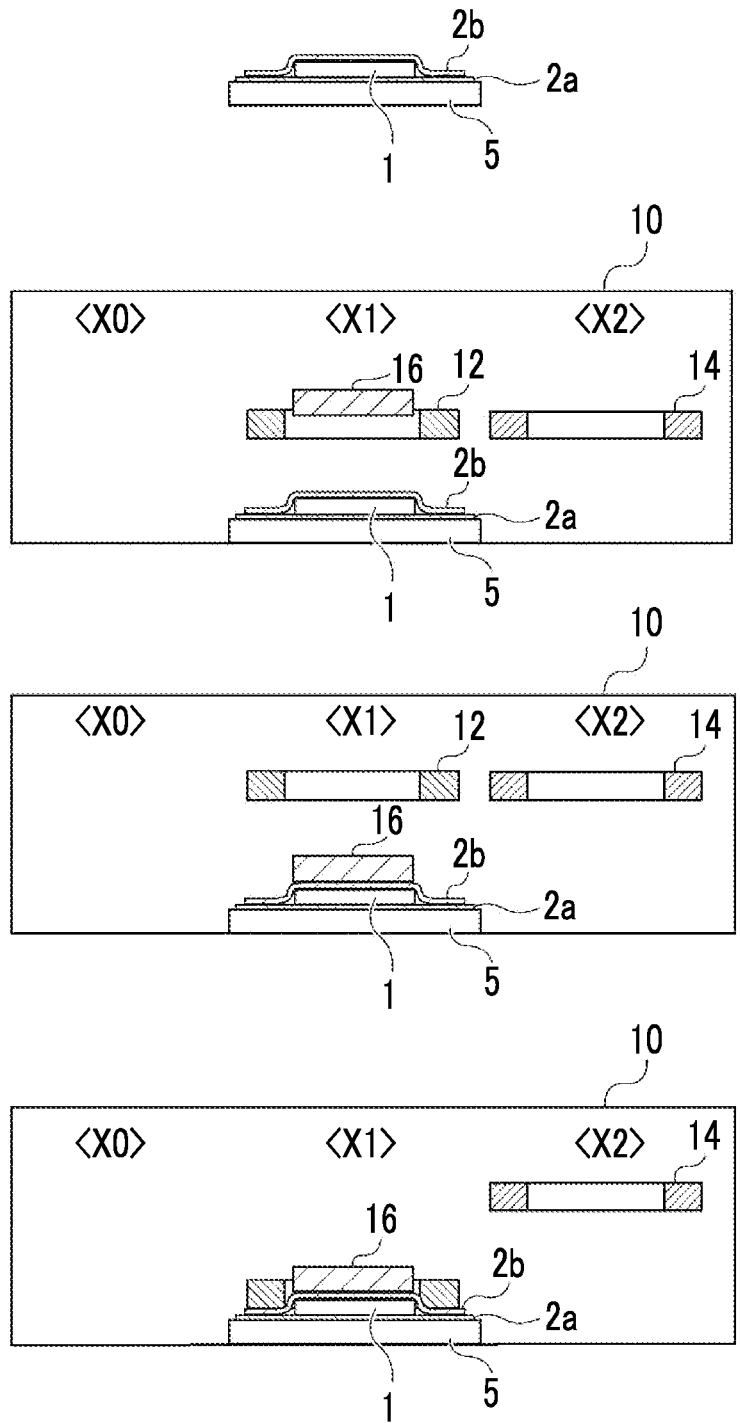
Figure 8:
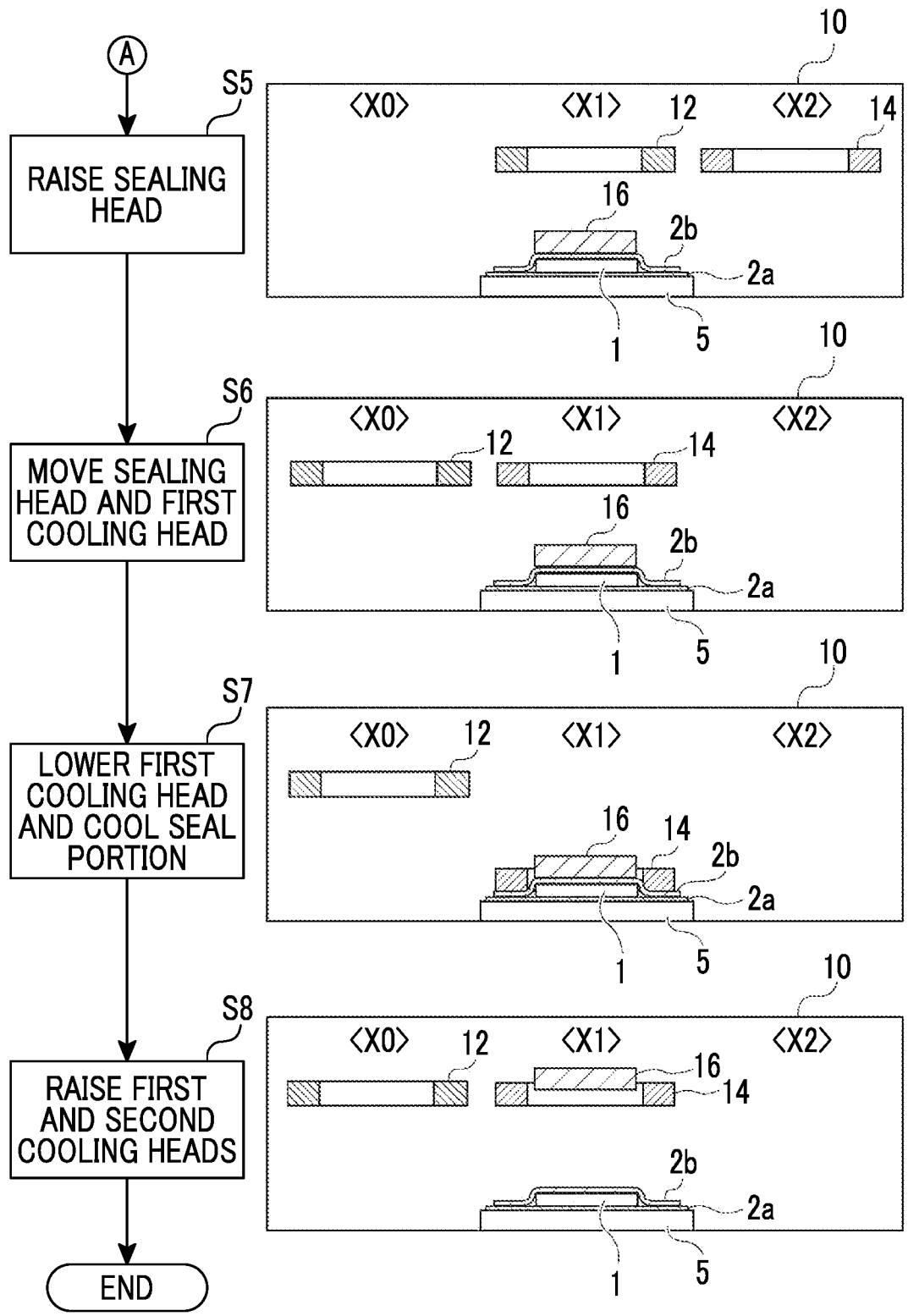
FIG. 8 is a diagram illustrating a processing step in the heat sealing device (No. 2).
Figure 9:
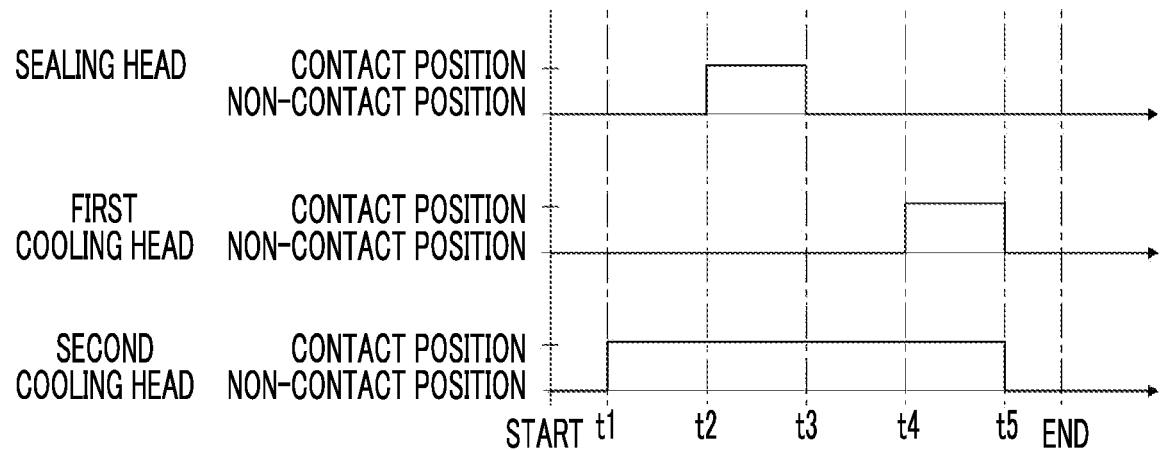
FIG. 9 is a timing chart for raising and lowering the sealing head, the first cooling head, and the second cooling head.

Next, a procedure of heat sealing using the heat sealing device 10 will be described with reference to FIGS. 7 to 9. FIGS. 7 and 8 are step diagrams, and FIG. 9 is a timing chart showing movement timings of the sealing head 12, the first cooling head 14, and the second cooling head 16 by the moving mechanism 18.

First, a laminate in which the article 1 is sandwiched between the films 2a and 2b is set on the pallet 5 for a heat sealing process (step S1).

Next, the laminate is placed into the heat sealing device 10 and is set at the processing position (step S2). At this time, as initial positions, the sealing head 12 and the second cooling head 16 are disposed at the processing position X1, and the first cooling head 14 is disposed at the second retracted position X2.

At time t1, the second cooling head 16 is lowered, and the second cooling head 16 is brought into contact with the article side region 8 of the film 2b (step S3). As a result, the second cooling head 16 is pressed against the article 1 via the film 2b to cool the article 1. By cooling the article 1, thermal damage to the article 1 due to radiant heat from the sealing head 12 is suppressed.

In a state in which the second cooling head 16 is in contact with the film 2b and the article 1 is cooled, at time t2, the sealing head 12 is lowered, and the sealing head 12 is brought into contact with the seal portion 6, thereby heat-welding the film 2a and the film 2b (step S4).

After the heat welding, at time t3, the sealing head 12 is raised, and the sealing head 12 is brought into a non-contact state with the seal portion 6 (step S5).

Next, the sealing head 12 is retracted from the processing position X1 to the first retracted position X0, and the first cooling head 14 is moved from the second retracted position X2 to the processing position X1 (step S6).

In a state in which the first cooling head 14 is set at the processing position X1, at time t4, the first cooling head 14 is lowered and brought into contact with the welded seal portion 6 to cool the seal portion 6 (step S7).

After cooling the seal portion 6, at time t5, the first cooling head 14 and the second cooling head 16 are raised, and the first cooling head 14 is brought into a non-contact state with the seal portion 6 (step S8).

The heat sealing process in the heat sealing device 10 is performed as described above.

Since the heat sealing device 10 of the present embodiment comprises, in addition to the first cooling head 14 that cools the seal portion 6, the second cooling head 16 that cools the article side region 8 in the film 2, which is located on the article side with respect to the seal portion 6, it is possible to suppress thermal damage to the article 1 packaged by the film 2 while improving the throughput of the heat sealing.

In the present embodiment, the moving mechanism 18 is configured to move the sealing head 12, the first cooling head 14, and the second cooling head 16 with respect to the film 2, but the moving mechanism 18 may move the article 1 and the film 2 with respect to the sealing head 12, the first cooling head 14, and the second cooling head 16. Alternatively, the moving mechanism 18 may be configured to move both of them together.

As described above, the heat sealing device 10 comprises the control unit 90 and the moving mechanism 18 that move each of the sealing head 12, the first cooling head 14, and the second cooling head 16, and the films 2a and 2b relative to each other, which makes it easy to control heat welding and cooling.

It is preferable that the control unit 90 controls each part of the sealing head 12, the first cooling head 14, the second cooling head 16, and the moving mechanism 18 such that the second cooling head 16 is brought into contact with the article side region 8 by the moving mechanism 18 to start cooling of the article side region 8 and then the sealing head 12 is brought into contact with the seal portion 6 by the moving mechanism 18 to start heat welding of the seal portion 6. In order to start the cooling of the article side region 8 by the second cooling head 16 prior to the heat welding, by bringing the sealing head 12 and the second cooling head 16 into contact with the films 2a and 2b at the same time, it is possible to reduce the thermal damage to the article 1 caused by the heat of the sealing head 12 as compared with a case of starting heat welding of the seal portion 6 and cooling of the article side region 8 at the same time. However, the second cooling head 16 and the sealing head 12 may be lowered at the same time to start cooling of the article side region and welding of the seal portion at substantially the same time.

Further, in the above step, although the first cooling head 14 and the second cooling head 16 are raised at the same time, they may be raised sequentially. The first cooling head 14 may be raised first and then the second cooling head 16 may be raised, or the second cooling head 16 may be raised first and then the first cooling head 14 may be raised.

In the present embodiment, the control unit 90 controls each part of the sealing head 12, the first cooling head 14, the second cooling head 16, and the moving mechanism 18 such that the sealing head 12 is retracted from the seal portion 6 by the moving mechanism 18 after heat welding by the sealing head 12 and the first cooling head 14 is brought into contact with the seal portion 6 by the moving mechanism 18. By providing such a control unit 90, the heat-welded seal portion 6 can be rapidly cooled, so that the throughput of the heat sealing can be improved.

Further, as in the present embodiment, it is preferable that the control unit 90 controls each part of the sealing head 12, the first cooling head 14, the second cooling head 16, and the moving mechanism 18 such that the cooling of the article side region 8 by the second cooling head 16 is continued from the start of the heat welding of the seal portion 6 by the sealing head 12 to the end of the cooling of the seal portion 6 by the first cooling head 14. Since the cooling by the second cooling head 16 is continued from the start of the heat welding to the end of the cooling by the first cooling head 14, it is possible to continue the cooling effect on the article 1 as compared with a case of stopping the cooling by the second cooling head 16 before the end of the cooling by the first cooling head 14, so that it is possible to reduce the thermal damage to the article 1.

In the heat sealing device 10 of the present embodiment, the first cooling head 14 and the second cooling head 16 include temperature sensors 41 and 62 and the cooling elements, respectively, and the control unit 90 controls the temperature to a preset temperature. However, the first cooling head 14 need only be configured to cool the heat-welded seal portion 6, and the temperature sensor 41 and the cooling element may not be provided or only the cooling element may be provided. Similarly, the second cooling head 16 may not be provided with the temperature sensor 61 and the cooling element or may be provided with only the cooling element as long as the thermal damage to the article 1 due to the radiant heat from the sealing head 12 can be suppressed.

In this present heat sealing device 10, it is preferable that the second cooling head Z-direction movement control section 94d controls the pressing pressure in a case where the second cooling head 16 is brought into contact with the article side region, in the present example, the pressing pressure in a case where the second cooling head 16 is pressed against the article 1. In the present embodiment, the second cooling head Z-direction moving portion 68 further comprises the load sensor 67 that detects the pressing pressure, and the second cooling head Z-direction movement control section 94d can control the pressing pressure based on a signal from the load sensor 67. Since the pressing pressure in a case where the second cooling head 16 is brought into contact with the article side region is controlled, the driving amount of the cylinder 66 can be controlled such that the pressing pressure on the contact with the article 1 does not exceed a predetermined set value. As a result, it is possible to suppress an excessive pressing pressure against the article 1, and it is possible to suppress damage to the article 1.

It is preferable that not only the second cooling head Z-direction movement control section 94d but also the sealing head Z-direction movement control section 94b controls the pressing pressure in a case where the sealing head 12 is brought into contact with the seal portion 6. In this case, the sealing head Z-direction moving portion 28 comprises a load sensor, and the sealing head Z-direction movement control section 94b need only be configured to control the pressing pressure based on a signal from the load sensor. Similarly, it is preferable that the first cooling head Z-direction movement control section 94c controls the pressing pressure in a case where the first cooling head 14 is brought into contact with the seal portion 6. In this case, the first cooling head Z-direction moving portion 48 comprises a load sensor, and the first cooling head Z-direction movement control section 94c need only be configured to control the pressing pressure based on a signal from the load sensor.

Figure 10:
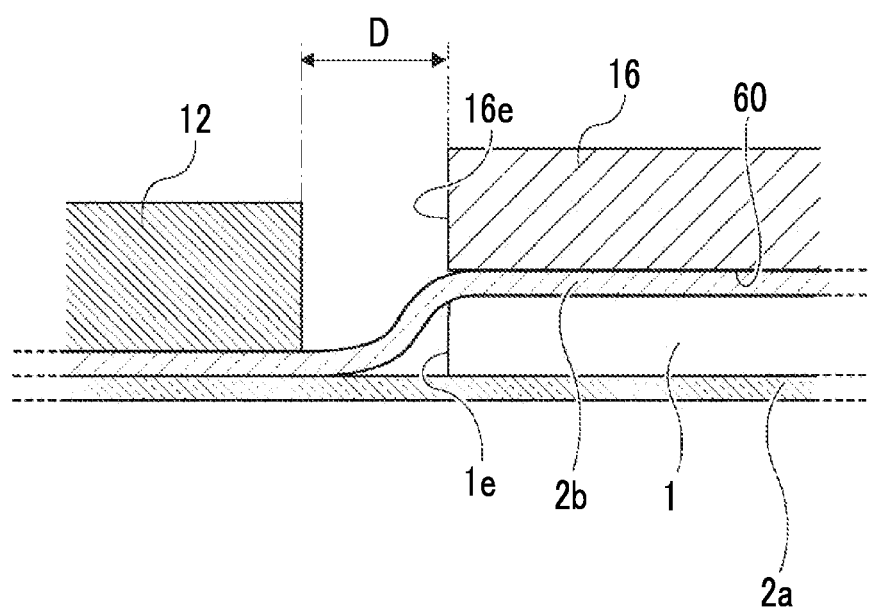
FIG. 10 is a diagram showing a positional relationship between an end part of the article and end parts of the sealing head and of the second cooling head during heat welding.

In the above embodiment, as shown in FIG. 6, in a case of cooling the article side region 8, the pressing surface 60 of the second cooling head 16, which is pressed against the article side region 8 of the films 2a and 2b, is disposed at a position facing the entire surface of the article 1. This makes it possible to cool the entire surface of the article 1, so that thermal damage to the article 1 can be effectively suppressed. Accordingly, it is particularly effective in a case where an article sensitive to heat is packaged. FIG. 10 is an enlarged view showing an end part of the article 1 and end parts of the sealing head 12 and of the second cooling head 16. As shown in FIG. 10, in the present embodiment, the positions of an end surface 16e on a sealing head 12 side of the pressing surface 60 of the second cooling head 16, which is pressed the article side region of the films 2a and 2b, and of an end surface 1e on the sealing head 12 side of the article 1 match. In the article 1, an end surface 1e side closest to the sealing head 12 is susceptible to thermal damage. However, in the present example, since the pressing surface 60 of the second cooling head 16 is disposed to face the entire surface of the article 1 and the second cooling head 16 cools the end part of the article 1, the effect of suppressing thermal damage is high.

However, in a case where the second cooling head 16 can cool at least a part of the article side region 8 that is located on the article 1 side with respect to the seal portion 6, the effect of suppressing thermal damage to the article can be obtained. That is, the technology of the present disclosure includes a case where the pressing surface 60 of the second cooling head 16 is not provided at a position facing the entire surface of the article 1.

Figure 11:
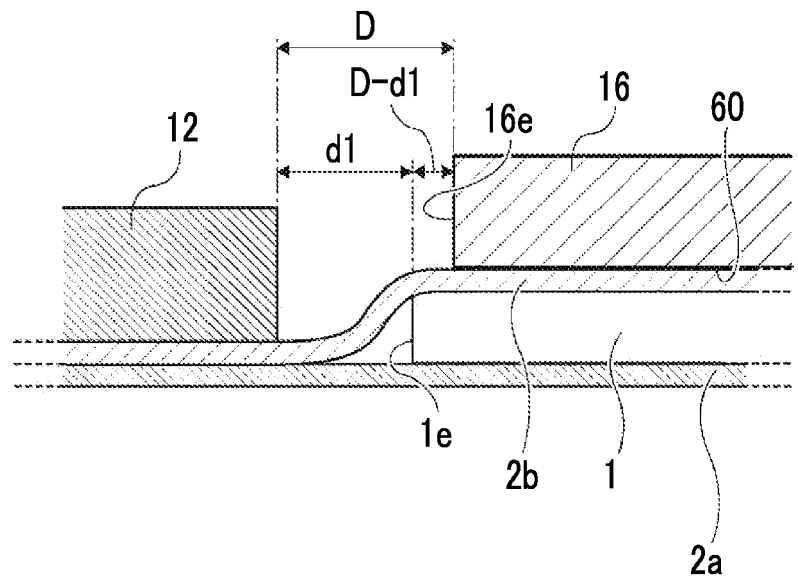
FIG. 11 is a diagram showing another example of the positional relationship between the end part of the article and the end parts of the sealing head and of the second cooling head during heat welding.

For example, as shown in FIG. 11, even a case where the end surface 16e of the second cooling head 16 is further away from the sealing head 12 than the end surface 1e of the article 1, that is, D>d1, is acceptable. However, from the viewpoint of efficiently suppressing thermal damage, it is preferable that a difference D−d1 between the distance interval D between the second cooling head 16 and the sealing head 12 and the distance interval d1 between the end surface 1e of the article 1 and the sealing head 12 is small.

Figure 12:
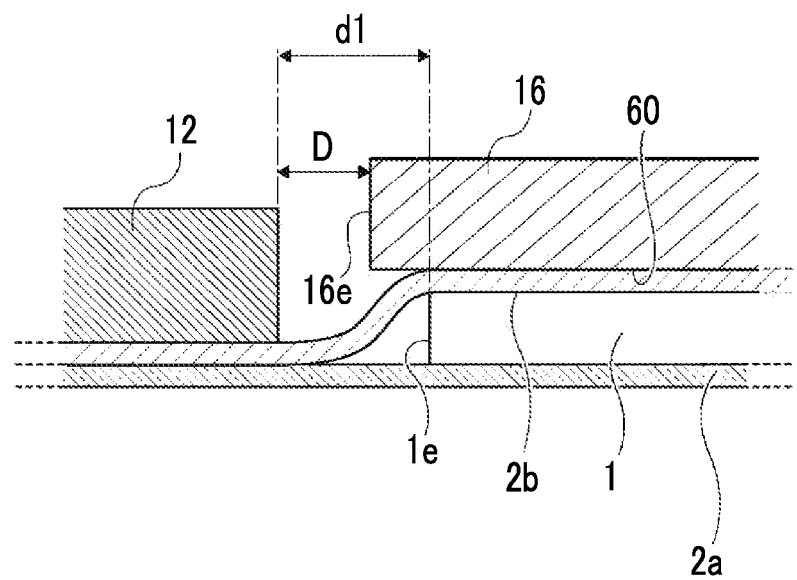
FIG. 12 is a diagram showing still another example of the positional relationship between the end part of the article and the end parts of the sealing head and of the second cooling head during heat welding.

As shown in FIG. 12, it is particularly preferable that the end surface 16e of the second cooling head 16 is located on the sealing head 12 side with respect to the end surface 1e of the article 1, that is, D<d1 is satisfied. That is, it is preferable that, in a case of cooling the article side region 8, the end part position on the sealing head 12 side of the pressing surface 60 of the second cooling head 16, which is pressed against the article side region 8 of the films 2a and 2b, is located on the sealing head 12 side with respect to the end part position on the sealing head 12 side of the article 1. In a case of cooling the article side region, the end part position on the sealing head 12 side of the pressing surface 60 of the second cooling head 16 is located on the sealing head 12 side with respect to the end part position on the sealing head 12 side of the article 1, so that thermal damage to the article can be effectively suppressed.

Hereinafter, design modification examples of the second cooling head 16 will be described.

Figure 13:
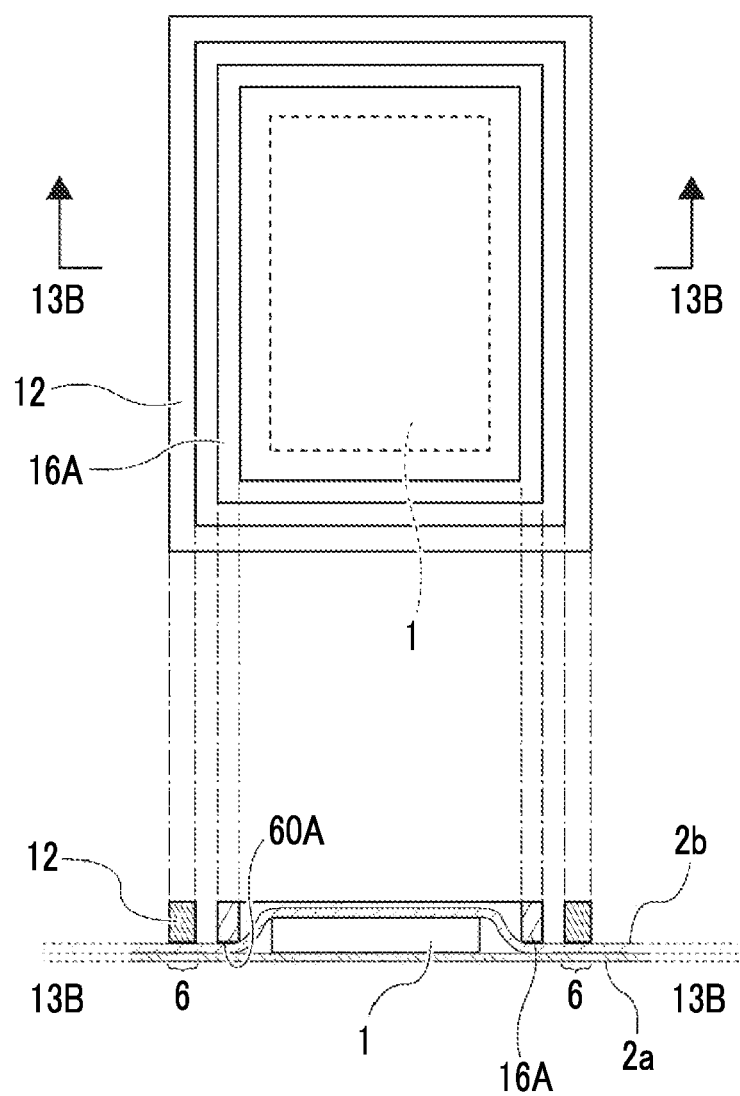
FIG. 13 is a diagram showing a positional relationship for a second cooling head of a design modification example 1 with the sealing head and the article.

FIG. 13 is a plan view showing the positional relationship for a second cooling head 16A of a design modification example 1 with the sealing head 12 and the article 1, and the lower figure is a cross-sectional view taken along line 13B-13B. As shown in FIG. 13, the second cooling head 16A has a rectangular frame shape similar to that of the sealing head 12, and in a case of cooling the article side region 8, a pressing surface 60A of the second cooling head 16A, which is pressed against the article side region 8 of the films 2a and 2b, may be located so as to surround the outer periphery of the article 1 without facing the article 1. Since the pressing surface 60A of the second cooling head 16A is located in the article side region 8 on the article side with respect to the seal portion 6, propagation of radiant heat from the sealing head 12 disposed on the seal portion 6 to the article side can be suppressed. In this way, even in a case where the article 1 is not directly cooled by the second cooling head 16A, the article can be indirectly cooled by disposing the second cooling head 16A on the outer periphery of the article 1, and thermal damage to the article 1 can be suppressed.

Figure 14:
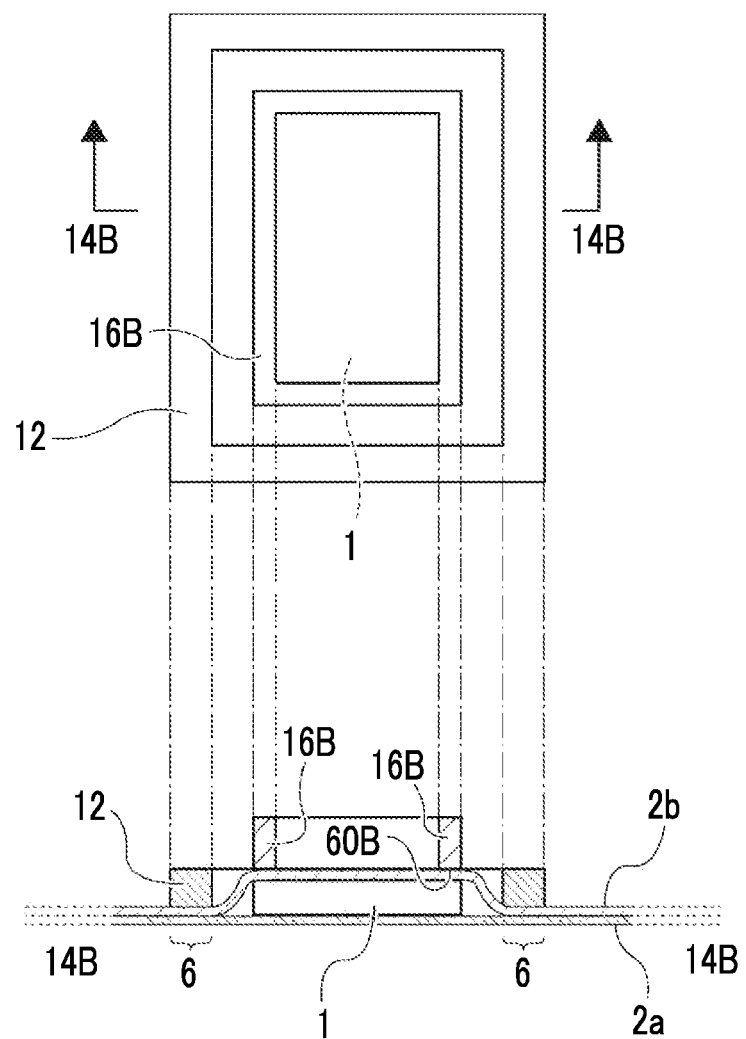
FIG. 14 is a diagram showing a positional relationship for a second cooling head of a design modification example 2 with the sealing head and the article.

FIG. 14 is a plan view showing the positional relationship for a second cooling head 16B of a design modification example 2 with the sealing head 12 and the article 1, and the lower figure is a cross-sectional view taken along line 14B-14B. As shown in FIG. 14, the second cooling head 16B has a rectangular frame shape similar to that of the sealing head 12, and in a case of cooling the article side region 8, a pressing surface 60B of the second cooling head 16B, which is pressed against the article side region 8 of the films 2a and 2b, is preferably disposed at a position facing at least the outer peripheral edge of the article 1. Since the pressing surface 60B of the second cooling head 16B is disposed at a position facing at least the outer peripheral edge of the article 1, thermal damage to the article 1 can be suppressed as compared with a case where the pressing surface 60B does not face the article 1.

Figure 15:
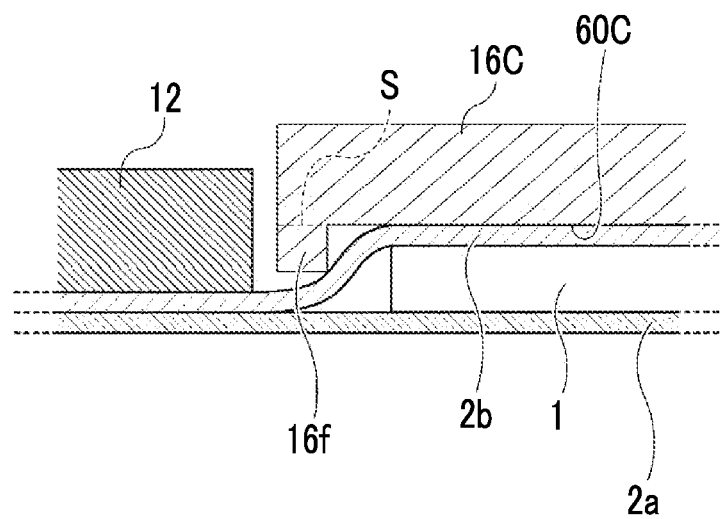
FIG. 15 is a diagram showing an end part shape of a design modification example 3.

FIG. 15 is an enlarged view showing the end part of the article 1 and end parts of the sealing head 12 and of a second cooling head 16C for the second cooling head 16C of a design modification example 3. As shown in FIG. 15, the second cooling head 16C includes a stepped portion 16f at the end part thereof. That is, the sealing head 12 side of a pressing surface 60C of the second cooling head 16C protrudes more than the article 1 side with the position facing the outer peripheral edge of the article 1 as a reference S. Since the sealing head 12 side of the pressing surface 60C of the second cooling head 16C protrudes more than the article 1 side with the position facing the outer peripheral edge of the article 1 as the reference S, it is also possible to suppress radiant heat from the sealing head 12, which comes around from below the second cooling head 16C, so that a higher thermal damage suppression effect can be obtained as compared with a case where the end part of the pressing surface 60C does not protrude.

Figure 16:
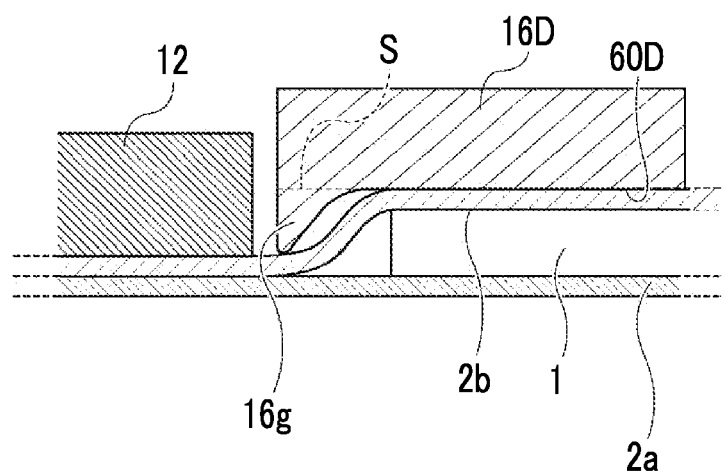
FIG. 16 is a diagram showing an end part shape of a design modification example 4.

FIG. 16 is an enlarged view showing the end part of the article 1 and end parts of the sealing head 12 and of a second cooling head 16D for the second cooling head 16D of a design modification example 4. As shown in FIG. 16, the second cooling head 16D has a tapered portion 16g in which the amount of protrusion increases while approaching the end part. That is, similarly to the second cooling head 16C, the sealing head 12 side of a pressing surface 60D of the second cooling head 16D protrudes more than the article 1 side with the position facing the outer peripheral edge of the article 1 as the reference S. Therefore, in the second cooling head 16D, it is also possible to suppress radiant heat from the sealing head 12, which comes around from below the second cooling head 16D, so that a higher thermal damage suppression effect can be obtained as compared with a case where the end part of the pressing surface 60D does not protrude.

In each of the above-described embodiments, as a hardware structure of a processing unit that executes various types of processing, such as the control unit 90, the movement control unit 94, and the temperature control unit 96, various processors to be described below can be used. The various processors include, as described above, in addition to the CPU which is a general-purpose processor that executes software to function as various processing units, a programmable logic device (PLD) which is a processor having a changeable circuit configuration after manufacturing, such as a field programmable gate array (FPGA), a dedicated electric circuit which is a processor having a dedicated circuit configuration designed to execute specific processing, such as an application specific integrated circuit (ASIC), and the like.

One processing unit may be composed of one of these various processors or a combination of two or more processors of the same type or different types (for example, a combination of a plurality of FPGAs or a combination of a CPU and an FPGA). Alternatively, a plurality of processing units may be composed of one processor.

Examples in which a plurality of processing units are composed of one processor include an aspect in which one or more CPUs and software are combined to constitute one processor and the processor functions as the plurality of processing units. Second, the examples include an aspect in which a processor that realizes the functions of the entire system including a plurality of processing units with one integrated circuit (IC) chip is used, as represented by system on chip (SoC) and the like. As described above, various processing units are composed of one or more of the above various processors as the hardware structures.

Furthermore, as the hardware structures of these various processors, more specifically, an electric circuitry in which circuit elements, such as semiconductor elements, are combined can be used.

From the above description, it is possible to grasp the technology described in Appendix below.

APPENDIX 1

A heat sealing device that seals a film for packaging an article by heat welding, with the film sandwiching the article in between and being disposed in a partially overlapped state around the article, the heat sealing device comprising:
 a sealing head that heat-welds a seal portion to be sealed in the film;
 a first cooling head that cools the seal portion after heat welding by the sealing head;
 a second cooling head that cools at least a part of an article side region in the film, which is located on an article side with respect to the seal portion;
 a moving mechanism that moves the film and each of the sealing head, the first cooling head, and the second cooling head relative to each other; and
 a processor,
 in which the processor is configured to control each part of the sealing head, the first cooling head, the second cooling head, and the moving mechanism.

The disclosure of Japanese patent application 2021-026600 filed on Feb. 22, 2021 is incorporated herein by reference in its entirety.

All documents, patent applications, and technical standards described in the present specification are incorporated in the present specification by reference to the same extent as in a case in which the individual documents, patent applications, and technical standards were specifically and individually stated to be incorporated by reference.

What is claimed is:

1. A heat sealing device that seals a film for packaging an article by heat welding, with the film sandwiching the article in between and being disposed in a partially overlapped state around the article, the heat sealing device comprising:
a sealing head that heat-welds a seal portion to be sealed in the film;
a first cooling head that cools the seal portion after heat welding by the sealing head; and
a second cooling head that cools at least a part of an article side region in the film, which is located on an article side with respect to the seal portion;
a moving mechanism that moves the film and each of the sealing head, the first cooling head, and the second cooling head relative to each other; and
a control unit that controls each part of the sealing head, the first cooling head, the second cooling head, and the moving mechanism.

2. The heat sealing device according to claim 1,
wherein the control unit brings the second cooling head into contact with the article side region through the moving mechanism to start cooling of the article side region and then brings the sealing head into contact with the seal portion through the moving mechanism to start heat welding of the seal portion.

3. The heat sealing device according to claim 2,
wherein the control unit retracts the sealing head from the seal portion through the moving mechanism and brings the first cooling head into contact with the seal portion through the moving mechanism after heat welding by the sealing head.

4. The heat sealing device according to claim 1,
wherein the control unit continues to cool the article side region through the second cooling head from a start of heat welding of the seal portion by the sealing head to an end of cooling of the seal portion by the first cooling head.

5. The heat sealing device according to claim 1,
wherein the control unit controls a temperature of at least one of the first cooling head or the second cooling head to a preset temperature.

6. The heat sealing device according to claim 5,
wherein the preset temperature is 20° C. or lower.

7. The heat sealing device according to claim 1,
wherein the control unit controls a pressing pressure against a contact region in a case where the second cooling head is brought into contact with the article side region.

8. The heat sealing device according to claim 1,
wherein, in a case of cooling the article side region, an end part position on a sealing head side of a pressing surface of the second cooling head, which is pressed against the article side region of the film, is located on the sealing head side with respect to an end part position on the sealing head side of the article.

9. The heat sealing device according to claim 1,
wherein, in a case of cooling the article side region, a pressing surface of the second cooling head, which is pressed against the article side region of the film, is disposed at a position facing at least an outer peripheral edge of the article.

10. The heat sealing device according to claim 9,
wherein, in a case of cooling the article side region, the pressing surface of the second cooling head, which is pressed against the article side region of the film, is disposed at a position facing an entire surface of the article.

11. The heat sealing device according to claim 9,
wherein a sealing head side of the pressing surface protrudes more than the article side with the position facing the outer peripheral edge of the article as a reference.

12. The heat sealing device according to claim 1,
wherein, in a case where a width of the sealing head is denoted by LH, and a distance interval between the sealing head and the second cooling head is denoted by D, a relationship between D and LH satisfies
$LH/1000 < D < 10LH$.

13. The heat sealing device according to claim 1,
wherein, in a case where a width of the sealing head is denoted by LH, and a width of the first cooling head is denoted by LC, a relationship between LH and LC satisfies
$LH/2 < LC$.

14. The heat sealing device according to claim 1,
wherein the seal portion is provided in a form of surrounding an entire periphery of the article, and
the sealing head also has a frame shape corresponding to a shape of the seal portion.

* * * * *